United States Patent [19]

Mally et al.

[11] Patent Number: 4,474,092
[45] Date of Patent: Oct. 2, 1984

[54] PRODUCT STORAGE BANK AND MERGE SYSTEM

[75] Inventors: Timothy G. Mally, Oregon; Carroll P. Hartl; Daniel L. Orloff, both of Madison, all of Wis.

[73] Assignee: Oscar Mayer Foods Corp., Madison, Wis.

[21] Appl. No.: 487,141

[22] Filed: Apr. 21, 1983

[51] Int. Cl.³ .............................................. B26D 7/06
[52] U.S. Cl. .......................................... 83/26; 83/78; 83/79; 83/91; 83/110; 198/460
[58] Field of Search .................... 83/91, 23, 26, 27, 79, 83/110; 198/435, 447, 460, 461, 649, 449, 456, 654

[56] References Cited

U.S. PATENT DOCUMENTS

| | | | |
|---|---|---|---|
| 2,576,218 | 11/1951 | Fox | 198/649 |
| 3,695,411 | 10/1972 | Tobey | 198/461 |
| 3,774,748 | 11/1973 | Dederer | 198/460 |
| 4,004,677 | 1/1977 | Heier | 198/461 |

FOREIGN PATENT DOCUMENTS

| | | | |
|---|---|---|---|
| 2335630 | 11/1974 | Fed. Rep. of Germany | 198/313 |
| 2817732 | 10/1979 | Fed. Rep. of Germany | 198/435 |

Primary Examiner—James M. Meister
Assistant Examiner—John L. Knoble
Attorney, Agent, or Firm—J. T. Harcarik; T. R. Savoie; D. J. Donovan

[57] ABSTRACT

An apparatus and method are provided for receiving products, such as stacks of sliced luncheon meat, in an intermittent flow pattern, for conveying the products in two generally parallel paths at two different flow rates, and for merging the two generally parallel paths into a single path through which the products flow on a non-intermittent basis. The two generally parallel paths have a fill mode during which an intermittent grouping of products are received onto the conveyor path, as well as a feed mode during which the intermittent grouping of products are fed in a continuous flow to a merging device. When one of the conveyor paths is in its fill mode, the other conveyor path is in its feed mode, and vice versa. The speed of each conveyor path during its fill mode is greater than that during its feed mode.

33 Claims, 12 Drawing Figures

PRODUCT STORAGE BANK AND MERGE SYSTEM

BACKGROUND AND DESCRIPTION OF THE INVENTION

The present invention generally relates to an improved apparatus and method for automatically banking an intermittent flow of products and merging those products into a combined, continuous flow of products. More particularly, the present invention relates to an apparatus and method whereby a plurality of products that are provided in intermittent groupings are diverted onto one of two parallel conveyor paths that is operating at a fill mode speed. After all of the products in the intermittent grouping have been received along this conveyor path, a feed mode thereof is activated to continuously feed the grouping of products to a merging station. At the merging station, the products are directed to a single pathway for subsequent operations, such as packaging. In an important aspect of this invention, the products are a plurality of stacks of sliced foodstuff such as luncheon meat, which stacks are intermittently grouped by virtue of the fact that the groups of stacks are from a series of different sticks or loaves that are individually sliced.

Over the years, food processing operations have become increasingly mechanized and automated in an effort to achieve a packaged food product that has a uniform consistency and that has a clean, damage-free appearance which promotes consumer confidence in the product, while at the same time reducing the labor intensity of such processing operations. One such food product that has received considerable attention in this regard is sliced luncheon meat that is packaged as stacks of meat slices. In order to take advantage of economies of scale in these types of operations, the luncheon meat is prepared in large sausage sticks or loaves, and these large products are then loaded into an automatic slicing apparaus and subsequently packaged in groups of slices. Known automatic slicing machines automatically weigh groups of slices and provide them as a series of meat slice stacks.

Traditionally, a meat processor provides a conveyor belt for receiving these stacks of meat slices, whereupon a worker neatens each stack and transfers each stack of meat slices into a packaging container or onto a packaging fixture for subsequent formation into a completed package of sliced luncheon meat. The operator is to consistently perform these neatening and transferring operations at the speed at which the stacks are conveyed from the automatic slicer which is faster than the outfeed of product. To accommodate this excess product, the operator "blanks" a stack of luncheon meat slices on a shelf provided for that purpose, and the banked stack is subsequently inserted into a packaging container or onto a packaging fixture when possible, usually during the time that it takes to reload the automatic slicer with a fresh stick or loaf.

This operation wherein the stacks of meat slices are banked until they are able to be deposited at a later time is an operation that is labor-intensive because it involves double handling of the product. Also, if the operator does not adequately neaten each and every stack, the finally packaged products can have an inconsistent appearance or the frequency of package rejection can be increased. Additionally, it is not always possible for the operator to deposit a stack of slices onto each and every product fixture as it is conveyed past the station at which the stacks of slices are transferred onto the packaging fixture or container. When this occurs, the line operates at less than full capacity, and many times the unfilled packaging fixture or container will continue to subsequent packaging or sealing stations, resulting in waste of packaging materials.

Accordingly, there is a need for a system that accounts for the intermittent feed characteristics which are associated with packaging operations that have inherent intermittent interruptions, such as are experienced by luncheon meat packaging lines wherein sticks or loaves of product are automatically sliced in a serial fashion. Such is accomplished by the present invention wherein a plurality of products that are provided in intermittent groupings are handled in an apparatus and in a manner whereby the intermittent groupings are transformed into a continuous and evenly spaced flow of products for subsequent handling.

It is accordingly a general object of the present invention to provide an improved apparatus and method for automatically banking a plurality of intermittently provided products.

Another object of the present invention is to provide an improved apparatus and method for automatically banking products that are provided in staggered groupings by utilizing dual, multiple speed lines and merging those lines into a continuous-flow single line.

Another object of this invention is to provide an improved apparatus and method for converting the intermittent flow from an automatic food slicer into a continuous flow of product for packaging thereof.

Another object of the present invention is to provide an improved apparatus and method for slicing luncheon meat and for orienting same for insertion into or deposit onto fixtures for packaging the stacks of sliced luncheon meat.

Another object of the present invention is to provide an improved apparatus and method which incorporates multiple-line timing features to account for planned and unplanned intermittent feed of product to the extent that the product outfeed therefrom is non-intermittent.

Another object of the present invention is to provide an apparatus and method that neatens stacks of sliced foodstuff while a flow of such foodstuff stacks is converted from a flow having intermittent gaps to one that is substantially continuous and uniform.

These and other objects of the present invention will become apparent from the following detailed description of this invention, taken in conjunction with the accompanying drawings, wherein:

The invention includes an apparatus and method for diverting intermittently spaced groupings of products onto one of two or more generally parallel conveyor paths that is operating at a fill mode speed. After all of the products in the thus diverted grouping have been transferred into the fill conveyor path, a feed mode for this conveyor thereof is activated, the feed mode speed being less than the fill mode speed. While this conveyor is subsequently feeding, an alternate conveyor begins its fill mode by way of diverting incoming product to it from the slicer. The conveyors of the dual conveyor system then alternate roles at the completion of the feed out/fill in operation. When either conveyor path is in such feed mode, it feeds each particular grouping of products to a merging assembly, wherein the grouping of products is fed to a single conveyor pathway, irrespective of which conveyor line is feeding the merge assembly at the feed mode speed. The outfeed from this merged single conveyor pathway is a non-gapped, continuous flow of individually uniform products, which flow is especially suitable for subsequent operations, such as package closure and sealing.

Figure 1:
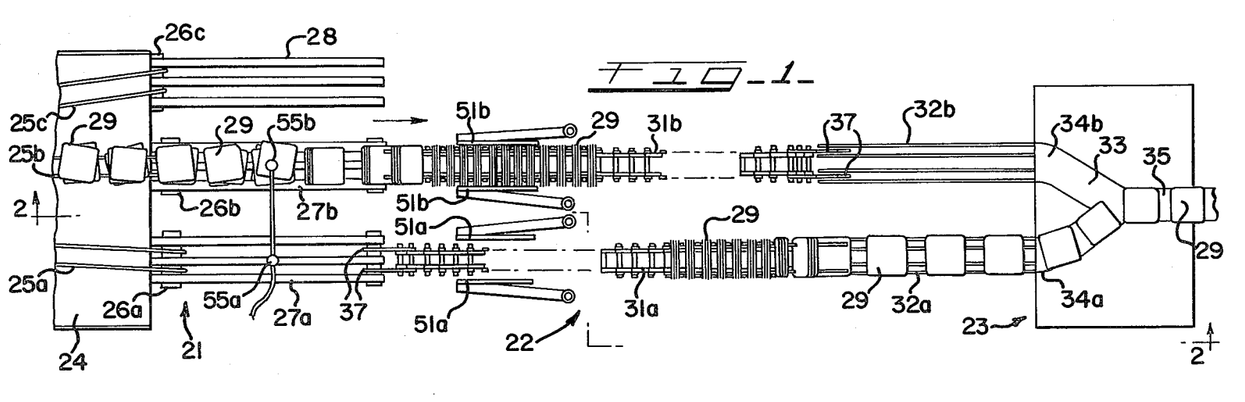
FIG. 1 is a generally schematic plan view illustrating the method and apparatus according to this invention.
Figure 2:
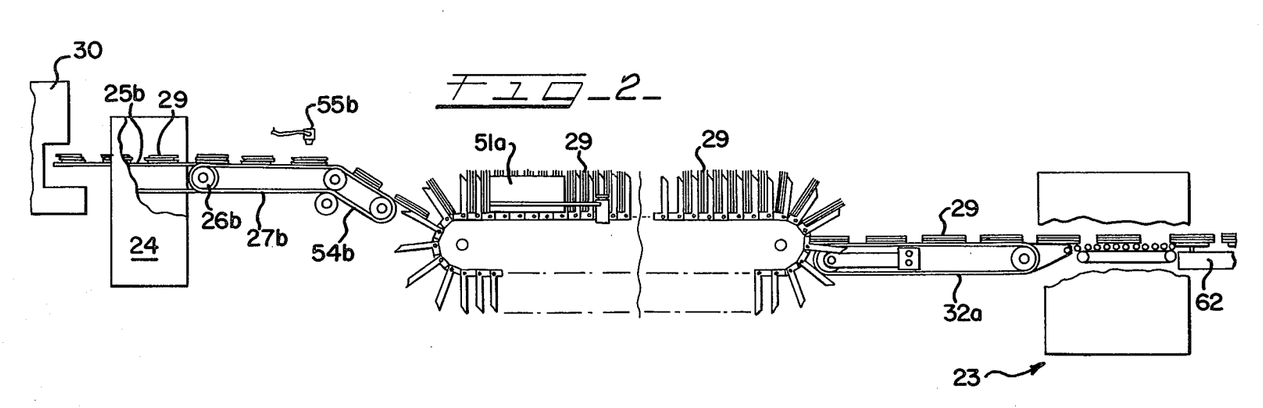
FIG. 2 is a generally schematic elevational view taken along line 2—2 of FIG. 1.

The apparatus as it is generally illustrated in FIG. 1 includes an infeed assembly, generally shown at 21, a bank assembly, generally designated as 22, and a merge assembly, generally designated as 23. While this combination of assemblies may be for the purpose of, and include structural details relative to, handling a variety of products, the embodiment illustrated herein is the embodiment that is preferred for use in connection with handling of foodstuff, most particularly sliced food products such as luncheon meat products that are sliced from elongated sticks or loaves of luncheon meat having generally round, square or rectangular cross-sections. Typically, such sticks or loaves are sliced at a generally uniform rate, but intermittent gaps in this feeding occur when the slicing apparatus is retracted and reloaded with a fresh stick or loaf.

With more particular reference to the preferred embodiment that is illustrated, the infeed assembly includes a diverter 24 of known construction, which includes a plurality of conveyor pathways 25a, 25b and 25c. These diverter pathways are typically constructed of endless bands mounted on rotatable shafts, including shafts 26a, 26b and 26c. Diverter pathway 25a feeds onto an infeed conveyor 27a, and diverter pathway 25b feeds onto an infeed conveyor 27b. The diverter pathway 25c feeds product onto a spur 28 for receiving products that are rejected by an automatic slicing and monitoring device 30 of known construction because they are of a weight and/or size that is outside of the standard set by the user of the apparatus.

The mechanism and method for activating the diverter pathways 25a, 25b and 25c are generally known, and this assembly is arranged such that, aside from non-conforming product that is diverted along pathway 25c, one grouping of stacks 29 of sliced luncheon meat from one stick or loaf thereof is fed along diverter pathway 25a and infeed conveyor 27a, and then the next grouping of stacks 29 from the next stick or loaf is fed along diverter pathway 26b and infeed conveyor 27b.

FIG. 1 illustrates a grouping of luncheon meat stacks of slices 29 from a single stick or loaf being fed along the diverter pathway 25b, the infeed conveyor 27b, and onto one line of the bank assembly 22.

Regarding the bank assembly 22, such includes a plurality of conveyor lines 31a, 31b for receiving the product stacks 29 from the infeed assembly 21. A conveyor control assembly (FIG. 3) drives each conveyor line 31a and 31b at at least two different conveyor speeds. Typically, each conveyor line 31a, 31b is driven at a fill mode speed and then at a slower feed mode speed. As the apparatus is illustrated in FIG. 1, the conveyor line 31b is operating at the faster fill mode speed, while the conveyor line 31a is operating at the slower feed mode speed.

More particularly, when product stacks 29 are being fed from one of the infeed conveyors 27a, 27b onto one of the conveyor lines 31a, 31b, then that particular conveyor line 31a, 31b is operating at a speed (the fill mode speed) that is substantially identical with the speed of the infeed conveyor 27a, 27b. When product stacks 29 are not being fed by the infeed conveyor 27a, 27b onto the conveyor line 31a, 31b, then that particular conveyor line 31a, 31b is operating at a speed (the feed mode speed) that is on the order of the speed of an outfeed conveyor 32a, 32b.

The merge assembly 23 is alternately clutched with each outfeed conveyor 32a, 32b. Preferably, the merge assembly 23 operates at a speed that is substantially the same as that of the outfeed conveyors 32a, 32b. The differential between the fill mode speed and the feed mode speed is such that the conveyor line 31a, 31b that is at the fill mode speed overtakes the other conveyor line 31b, 31a that is at the feed mode speed, such that the product on the faster moving conveyor line 31a, 31b overtakes that on the other conveyor line 31b, 31a, to thereby eliminate the gap in product feed that is caused by having to retract and fill the automatic slicer 30, which is upstream of the diverter 24.

Merge assembly 23 includes a generally Y-shaped pathway 33 having branches 34a, 34b that combine into a single outfeed line 35. Typically, the outfeed line 35 will be driven by a packaging assembly (not shown), through the operation of which each product stack 29 will be packaged, closed and sealed as desired, such as by positioning the product stack 29 onto a panel and sealing that fixture into a finished package product. The merge assembly 23 may include any suitable structure for guiding the product stacks 29 from one of the branches 34a, 34b onto the outfeed line 35.

Figure 3:
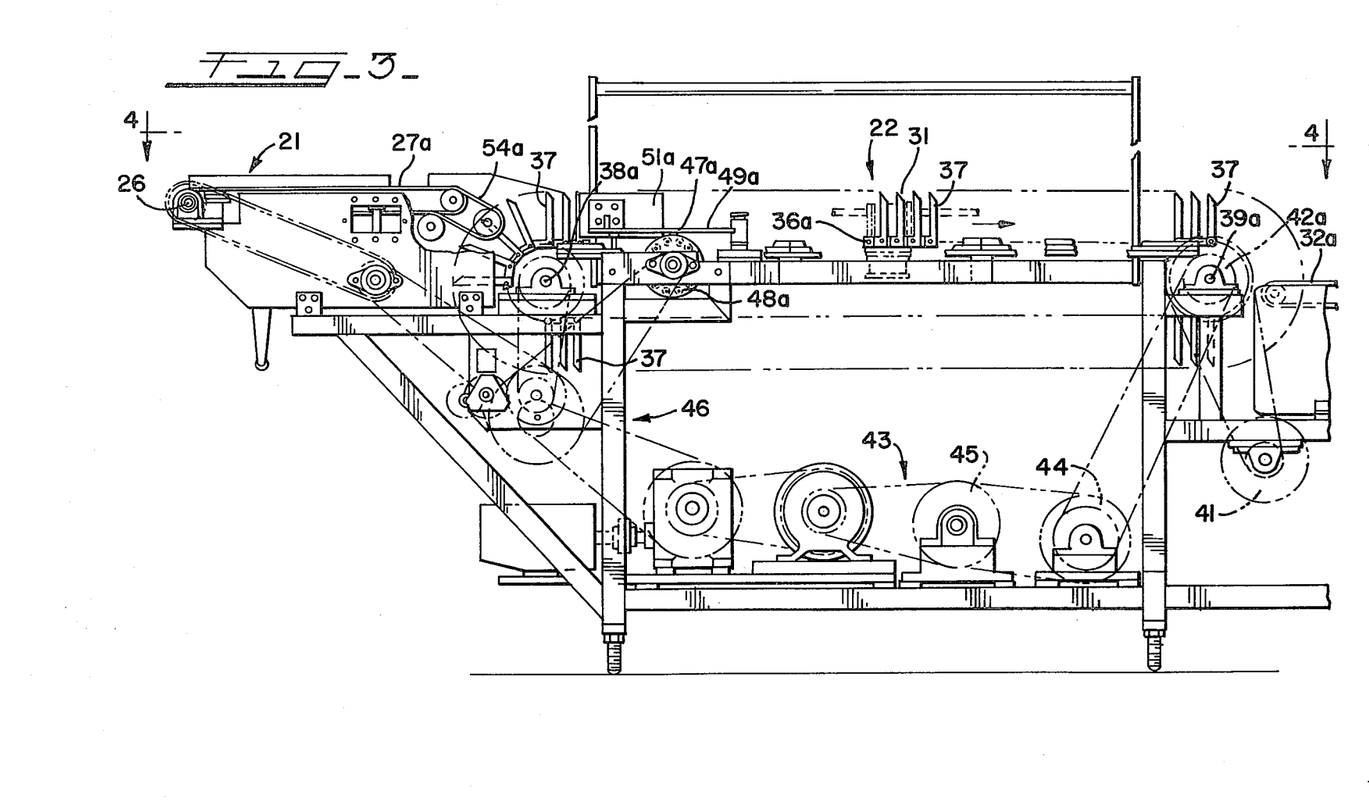
FIG. 3 is a detailed elevational view depicting a preferred banking assembly according to the invention.
Figure 4:
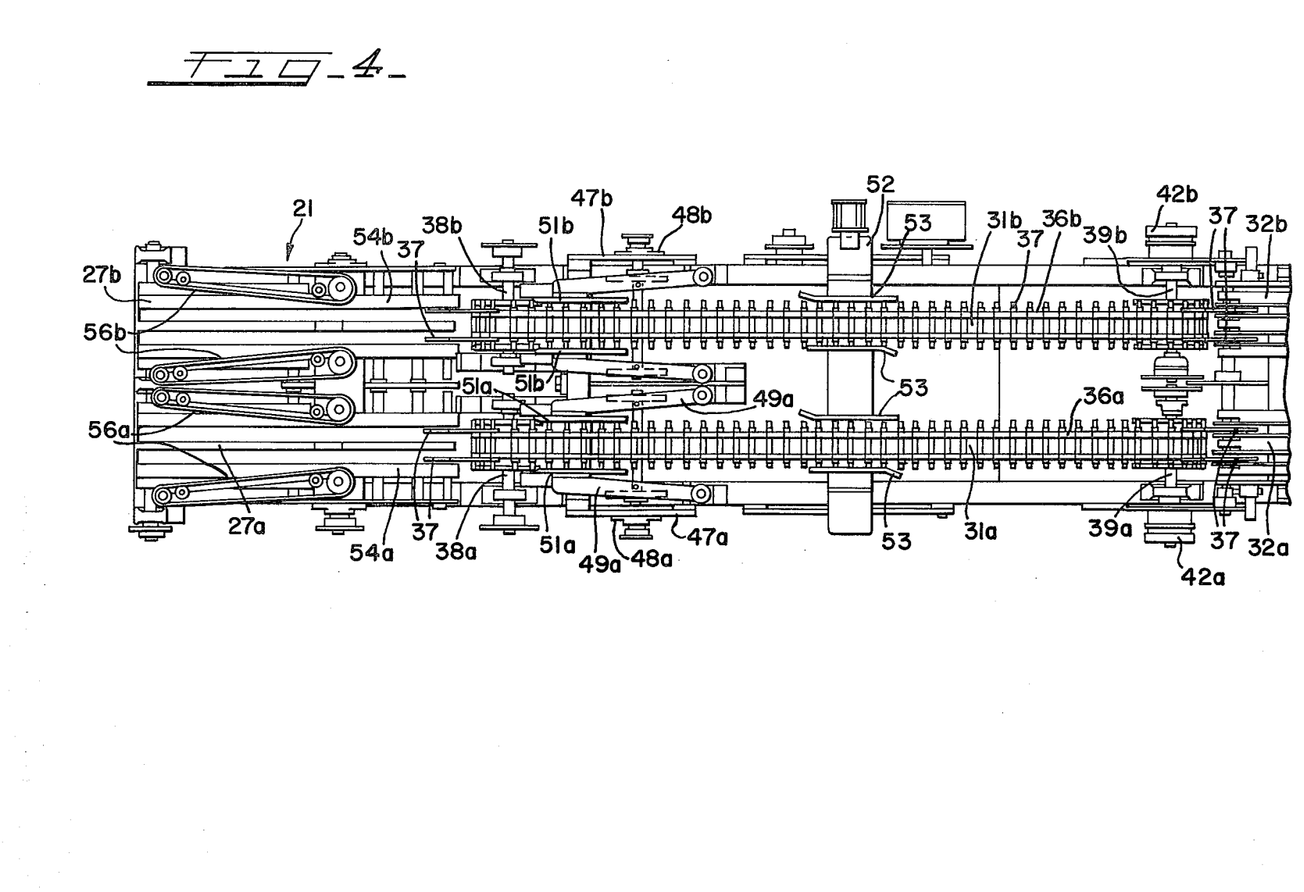
FIG. 4 is a plan view generally along the line 4—4 of FIG. 3.

FIG. 3 provides further details of the preferred structure of the bank assembly 22 and of the infeed thereto and outfeed therefrom. In the illustrated preferred embodiment, the components are structured whereby the product stacks 29 are horizontally oriented when they are on the infeed assembly 21, are vertically oriented when they are on the bank assembly 22, and are again horizontally oriented when on the outfeed conveyors 32a, 32b and the merge assembly 23.

This preferred approach has certain advantages over an alternative approach, such as one in which the product stacks are horizontally oriented throughout their passage within the apparatus. One advantage is that vertical stacking retains product temperature since the vertical product is denser than the horizontal product and does not contact as much metal surface area. Also, vertically oriented stacks require less linear space than do horizontally oriented stacks, with the result that a bank assembly having vertically oriented product stacks accommodates the needed number of product stacks through an overall length that is substantially less than would be required to accommodate the same number of product stacks were they to be horizontally oriented. Additionally, vertically oriented product stacks tend to be easier to neaten than horizontal stacks because each slice of product in the stack rests on a narrow edge thereof, rather than the face thereof, and because no vertically oriented slice lies on top of another vertically oriented slice.

With square product, vertical stacking establishes a bottom datum plane and makes rotation onto this plane easier. Round product does not require this rotation for stacking. Product is made to enter the bank assembly 22 in a downhill manner in order to bounce the product slices at the bottom to knock such slices into this datum plane. It should be noted also that to take full advantage of this bank concept, all of the product in a loaf must be sliced out into a bank conveyor such that the gaps in product flow occur between sticks only.

Regarding the preferred embodiment illustrated wherein the product stacks 29 are vertically oriented as they move along the bank assembly 22, the product stacks 29 are generally horizontally oriented while they are within the infeed assembly 21, and this general horizontal orientation is changed to a generally vertical orientation at the location of interaction between the infeed assembly and the bank assembly 22. Additionally, at the location of interaction between the bank assembly 22 and the outfeed assembly or conveyor 32a, 32b, the product stacks 29 are changed from a generally vertical orientation to a generally horizontal orientation.

Each conveyor line 31a, 31b of the bank assembly 22 includes an endless track 36a, 36b having a plurality of outwardly projecting support tines 37 between which the product stacks 29 are positioned while they are on the bank assembly 22. The endless track 36a, 36b is mounted along suitable rotatable shafts 38a, 38b and 39a, 39b, and the endless track 36 is driven therealong by drive assemblies suitable for driving conveyor line 31a at one speed while driving conveyor line 31b at a different speed. Such may be accomplished, for example, by appropriate motor and clutch arrangements and/or by a servomotor or hydraulic assembly. The drive assemblies also provide for intermittent stopping and starting, or indexing, of each conveyor line 31a, 31b in response to signals generated by the presence or absence of product stacks 29 at selected locations along the apparatus.

A feed mode drive assembly 41 drives the desired conveyor line 31a or 31b at the feed mode speed. Such feed mode drive assembly 41 includes drive members 42a, 42b for driving either, but not both, of rotatable shafts 39a or 39b, at any one time, the shafts being independent of each other.

A fill mode drive assembly, generally designated as 43, is in communication with either or both of the rotatable shafts 38a and 39a when the conveyor line 31a is to be driven at the fill mode speed. It can include a suitable slip clutch 44 and motor 45 and appropriate clutching and gearing arrangements as generally illustrated at 46. The fill mode drive assembly 43 is in communication with either or both of the rotatable shafts 38b and 39b when the conveyor line 31b is to be driven at the fill mode speed. The fill mode drive assembly 43 is drivingly disengaged from the rotatable shafts 38a and/or 39a when such shafts are being driven by the feed mode drive assembly 41, and the fill mode drive assembly 43 is drivingly disengaged from the rotatable shafts 38b and/or 39b when such shafts are being driven by the feed mode drive assembly 41.

The gearing arrangements 46 may also drive a tamping assembly 47a, 47b for activating same when the respective conveyor line 31a, 31b is in its fill mode. Each tamping assembly includes a reciprocating drive arrangement 48a, 48b to reciprocate arms 49a, 49b and tamper plates 51a, 51b for simultaneously tamping the vertical edges of the product stacks 29 in order to neaten such stacks. This neatening operation can be assisted by a vibrator assembly 52, which preferably includes vibratory rails 53 for imparting a low amplitude, high frequency impact to the product stacks 29 as they move through the vibrator assembly 52.

Referring to the infeed assembly 21, each infeed conveyor 27a, 27b preferably includes a ramp 54a, 54b that projects downwardly into generally meshing interrelationship with the support tines 37 of the conveyor lines 31a, 31b in order to facilitate transfer of the product stacks 29 from the infeed assembly 21 to the bank assembly 22. The infeed conveyors 27a, 27b preferably move the products 29 at a constant speed from the diverter 24 and onto the respective conveyor line 31a, 31b. Appropriate signal means, such as the illustrated respective electronic eye assemblies 55a, 55b, indicate when a product stack 29 is located on the respective infeed conveyor 27a, 27b. When the respective conveyor line 31a, 31b is in its fill assembly mode, it will proceed at the fill mode speed, which movement will stop at a designated time after the respective electronic eye assembly 55a, 55b indicates that there is a gap in the product stack grouping at the electronic eye.

Infeed assembly 21 preferably further includes rotating side belt pairs 56a, 56b which initially neaten the product stacks from the diverter 24. In the preferred arrangement of these side belt pairs, 56a, 56b, each moves at a speed that is substantially the same as the speed of movement of the respective infeed conveyors 27a, 27b in order to minimize drag on the individual moving slices at the locations where they contact the side belt pairs 56a, 56b. Each belt of the respective side belt pairs 56a, 56b is oriented such that the spacing between each respective pair is diminished in a gradually tapering manner in a downstream direction.

With reference to the location of exchange of product stacks 29 between the bank assembly 22 and the outfeed conveyors 32a, 32b, the tines 37 generally intermesh with the respective outfeed conveyors 32a, 32b to thereby effect a transfer of the product stacks 29 without significantly disrupting the neatened stacks 29. Preferably, in order to avoid undesirable contact between each product stack 29 and the tines immediately trailing it, each respective outfeed conveyor 32a, 32b moves at a speed such that the neatened product stacks 29 are transported away from the area of intermeshing before the trailing tines 37 enter the intermeshing location.

Figure 5:
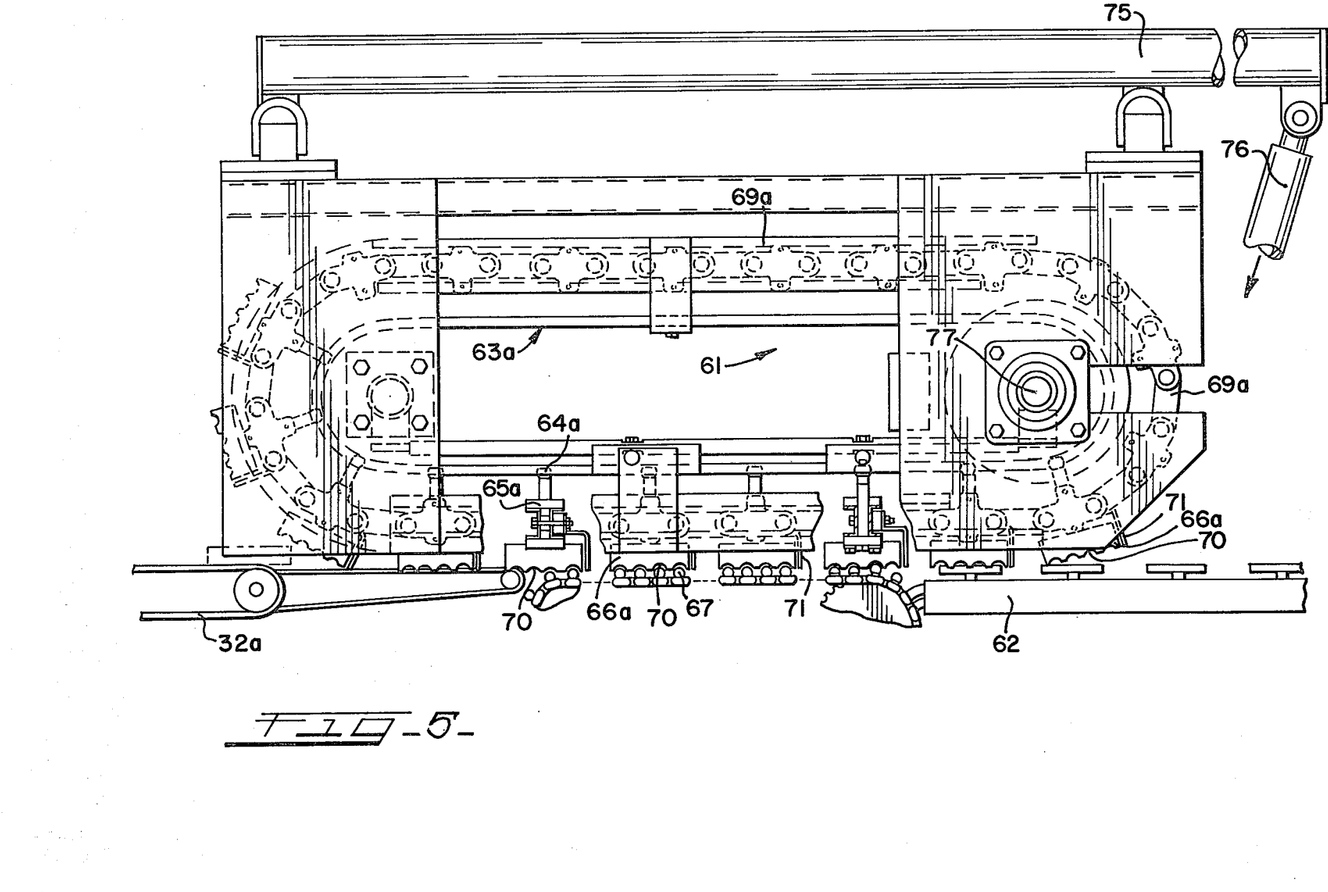
FIG. 5 is an elevational view of the preferred merge assembly according to this invention.
Figure 6:
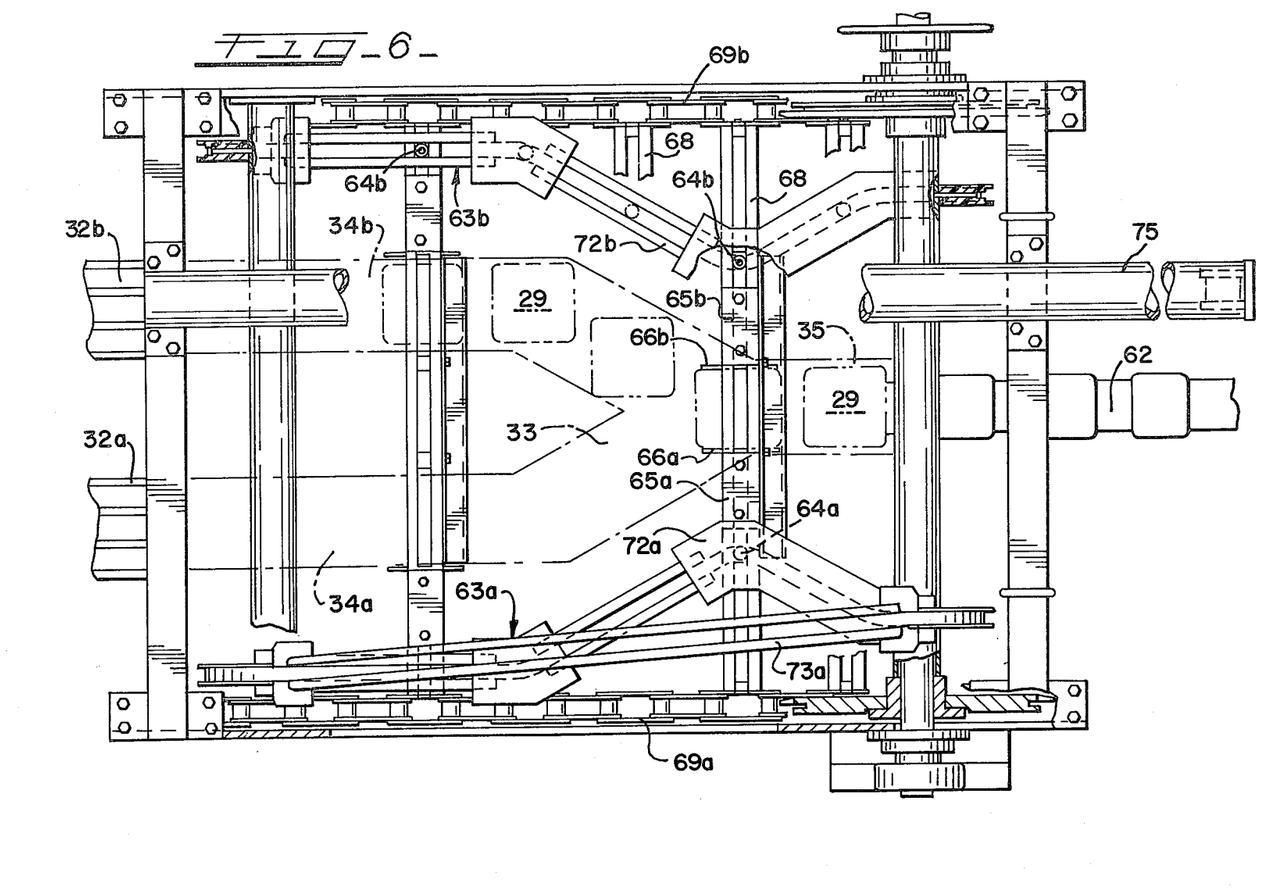
FIG. 6 is a broken-away plan view of the merge assembly illustrated in FIG. 5.

Referring more particularly to the merge assembly 23, the Y-shaped pathway 33 thereof preferably includes a cam trackway assembly, generally designated as 61 in FIG. 5. Assembly 61 transfers equally spaced products 29 from either of the two outfeed conveyors 32a, 32b to the single outfeed line 35 and preferably places such products 29 onto a carrier line 62 for transport to a subsequent handling station. Typically, the speeds of each conveyor line 32a, 32b and of the carrier line 62 are generally uniform. The assembly 61 provides a continuous flow of equally spaced products 29 in single file, without interruption, which products 29 are from either of the two outfeed conveyors 32a, 32b.

The cam trackway assembly 61 illustrated in FIGS. 5 through 8 includes cam tracks 63a, 63b, and a plurality of cam followers 64a, 64b ride therewithin. A pusher assembly 65a, 65b depends from each of the cam followers 64a, 64b. Each pusher assembly 65a, 65b includes a movable rake 66a, 66b for pushing products 29 generally toward the longitudinal center of the cam trackway assembly 61, preferably while such products 29 are moving along the Y-shaped pathway 33, typically while being supported by a set of elongated fixed circular rods 67 attached to a moving chain. Preferably, each movable rake 66a, 66b has indents 70 that are generally complementary to the transverse cross-section of the rods 67. Each pusher assembly 65a, 65b is slidably mounted along a transverse trackway 68, and each transverse trackway 68 is transported through the trackway assembly 61 by suitable means, such as the illustrated chain and sprocket assembly 69a, 69b.

A fence 71 depends from the downstream side of each transverse trackway 68 in closely spaced, but non-contacting relationship with respect to the movable rakes 66a, 66b. Such fences 71 limit the movement of the products 29 in the downstream direction in order to help maintain the products 29 in their neatened condition as they are transported through the Y-shaped pathway 33 while resting on the elongated rods 67.

Figure 7:
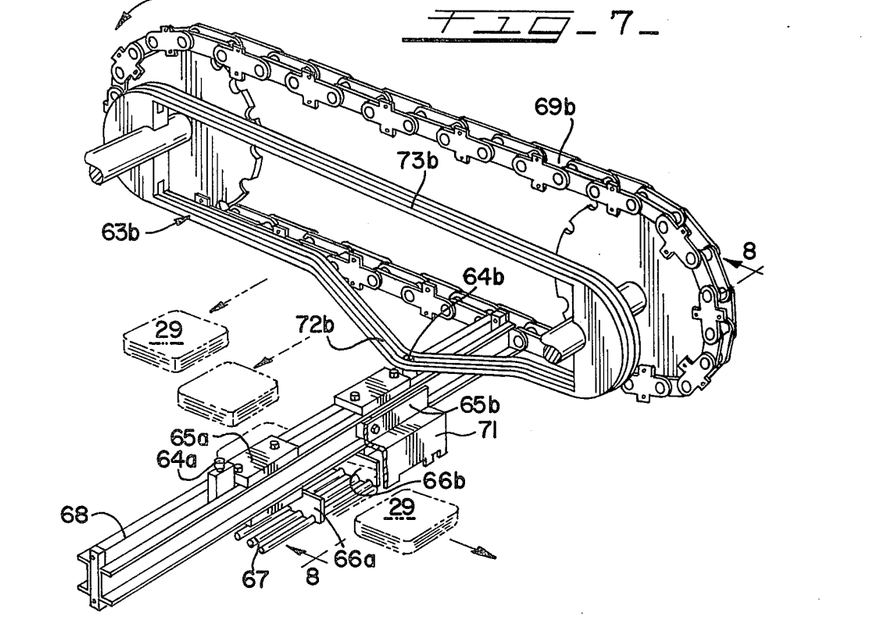
FIG. 7 is a detail, perspective view of one side of the merge assembly of FIG. 5.
Figure 8:
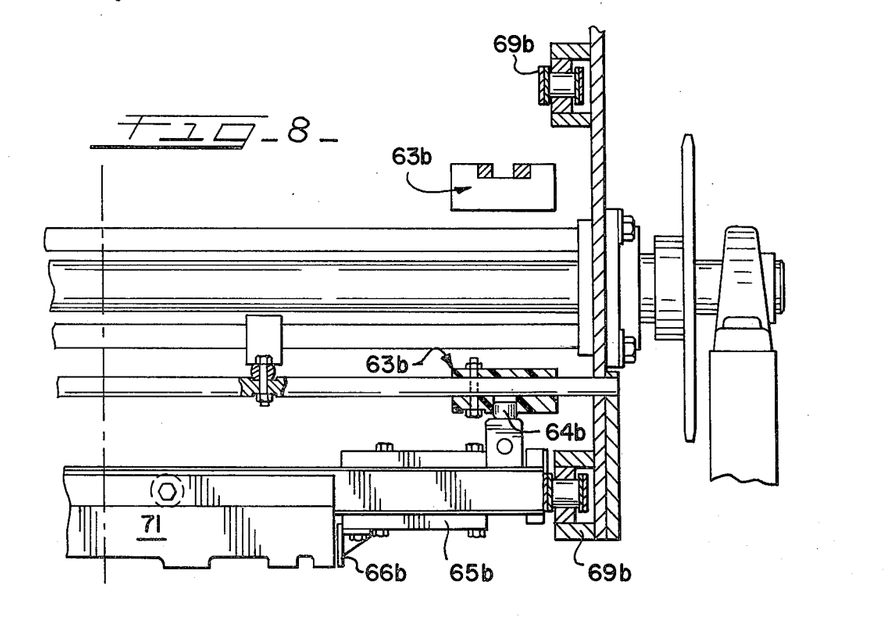
FIG. 8 is a sectional view generally along the line 8—8 of FIG. 7.

The operation of the cam trackway assembly 61 is perhaps best seen in FIG. 7. An appropriate drive device rotates the chain and sprocket assembly 69b to thereby translate each of the transverse trackways 68 therealong in the generally illustrated counterclockwise direction. At the same time, each respective cam follower 64b moves through the respective cam track 63a, 63b to thereby move each pusher assembly 65a, 65b and the rake 66a, 66b depending therefrom. Each rake 66a, 66b moves in direct response to the shape of the cam track 63a, 63b. More particularly, each cam track 63a, 63b varies in its spacing from the longitudinal center of the cam trackway assembly 61. Each cam track 63a, 63b includes a lower section including an elbow track portion 72a, 72b which extends toward the longitudinal center of the assembly 61 at an innermost location, after which the cam track 63a, 63b directs the cam follower 64 in a direction generally away from the longitudinal center of the assembly 61. Upper cam track portions 73a, 73b complete the return of the cam followers 64a, 64b and the rakes 66a, 66b to their locations that are outermost with respect to the longitudinal center of the assembly 61.

As the cam followers 64a, 64b thus follow the cam track 63a, 63b, each rake 66a, 66b moves from its outermost position at the upstream end of the cam track 63a, 63b to its innermost position at the apex of the Y-shaped pathway 33, which is the position illustrated in FIG. 7. Preferably, each rake 66a, 66b moves in substantially the same manner and to substantially the same extent as does each rake 66b, 66a, with the result that products 29 are guided to a location between the rakes 66a and 66b at the innermost location illustrated in FIG. 7, irrespective of whether the products 29 are from the outfeed conveyor 32a or the outfeed conveyor 32b.

Figure 9:
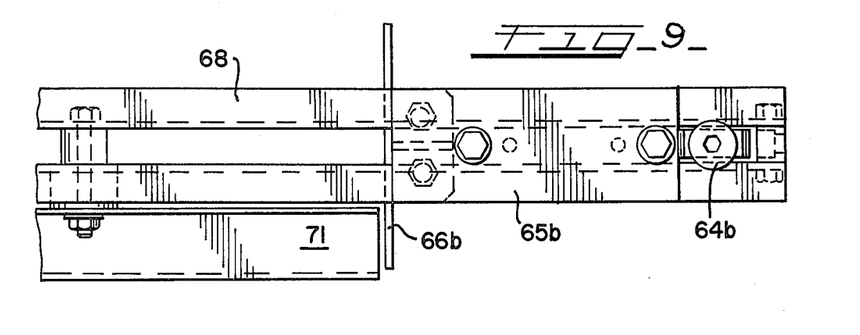
FIG. 9 is a plan view of a portion of a fence member within the merge assembly of FIG. 5.
Figure 10:
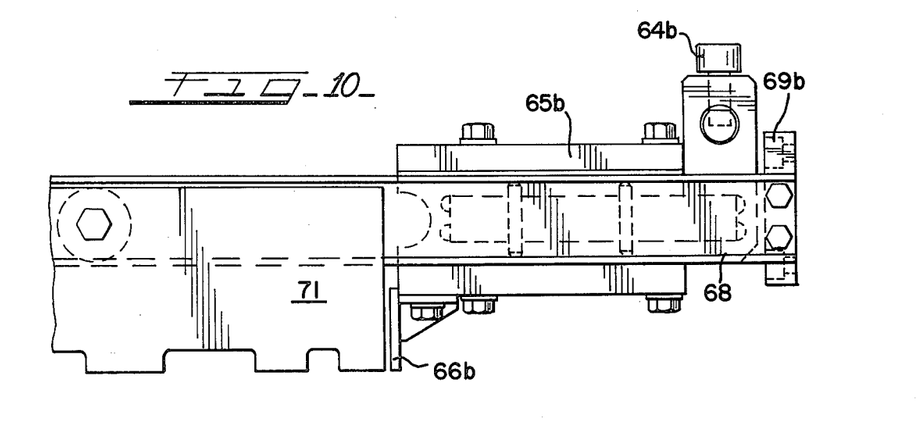
FIG. 10 is an elevational view of the fence member as viewed from the outfeed end of the merge assembly.
Figure 11:
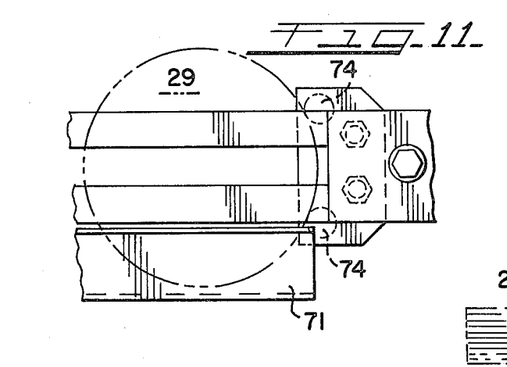
FIG. 11 is a detail plan view of an alternative rake member of the merge assembly, shown in a product engaging orientation.
Figure 12:
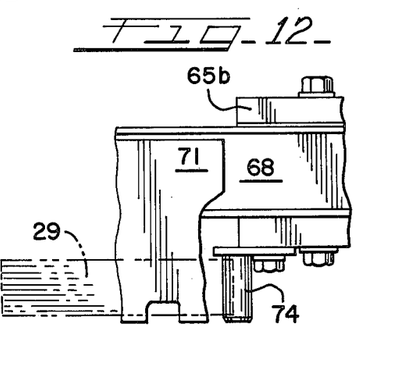
FIG. 12 is an elevational view of the rake assembly of FIG. 11.

Further details of the pusher assemblies 65a, 65b and of the fences 71 are illustrated in FIGS. 9 and 10. The rakes 66a, 66b shown therein are particularly well suited for merging products 29 which have generally square cross-sections, although this structure also performs quite adequately for products 29 having generally rounded cross-sections. Especially advantageous results are realized for round products 29 when the rake 66a, 66b takes the form of a pair of downwardly depending rake pins 74 (FIGS. 11 and 12) which contact the products 29. Such rake pins 74 have enhanced complementary characteristics with respect to the products 29 having a generally circular cross-section. When rakes 66a, 66b are used on round products 29, each rake contacts the product at substantially only one location. When the pair of rake pins 74 are utilized, this contact is at at least two locations.

In the preferred cam tracking assembly 61 illustrated, the entire assembly 61 can be lifted clear of the underframing of the merge assembly 23, including the outfeed conveyors 32a, 32b, the set of elongated fixed circular rods 67, and the carrier line 62. Such is readily accomplished by a lift assembly 75 (FIG. 5). When lift assembly 75 is activated, for example by movement of hydraulic rod 76 in the generally downward direction illustrated, the cam trackway assembly 61 rotates about a suitable location, such as pivot 77, in order to thereby raise the upstream end of the assembly 61.

Inasmuch as this invention can be embodied in various forms, it is to be construed and limited only by the scope of the appended claims.

What is claimed is:

1. An apparatus for banking and merging a continuous outflow of products from an infeed flow of products having intermittent gaps in the infeed flow, comprising:
    means for infeeding a flow of a plurality of groupings of products to the apparatus, said infeed flow means providing said products in groupings having intermittent gaps therebetween;
    a multiplicity of generally parallel banking lines downstream of said infeed flow means, each said banking line having means for receiving said products and for translating same along an elongated conveyor pathway thereof in a direction away from said infeed flow means;
    mode control means for regulating the product translating speed of each said generally parallel banking line at either a fill mode speed or a feed mode speed, said fill mode speed being greater than said feed mode speed, said mode control means imparting a fill mode to one of said banking lines while imparting a feed mode to another of said banking lines and also imparting a feed mode to said one banking line while imparting a fill mode to said another banking line;
    means for diverting one of said groupings of products onto said one banking line when same is in its fill mode and for diverting another of said groupings of products onto said another banking line when same is in its fill mode, said diverting means being downstream of said infeed flow means and upstream of said multiplicity of banking lines; and
    merge means downstream of said multiplicity of banking lines for combining the groupings of products from each said elongated conveyor pathway into a single outfeed line of products, said merge means receiving products from each said respective banking line when same is in its feed mode.

2. The banking and merging apparatus of claim 1, further including a foodstuff slicing device upstream of said infeed flow means, whereby said infeed flow means provides a plurality of groupings of sliced foodstuff products.

3. The banking and merging apparatus of claim 1, wherein said diverting means includes a plurality of respective diverter conveyor pathways which are generally in line with said respective multiplicity of generally parallel banking lines.

4. The banking and merging apparatus of claim 1, wherein said infeed means includes a plurality of respective infeed conveyors having a product movement speed substantially the same as said fill mode speed.

5. The banking and merging apparatus of claim 1, wherein said merge means conveys products therethrough at a speed generally on the order of said feed mode speed.

6. The banking and merging apparatus of claim 1, wherein said mode control means regulates the product translating speeds of the respective banking lines to the extent that products on said banking line moving at the fill mode speed overtake products on said banking line moving at the feed mode speed.

7. The banking and merging apparatus of claim 1, wherein said merge means includes a generally Y-shaped pathway having respective branches that receive products which have been translated along said respective banking lines.

8. The banking and merging apparatus of claim 1, wherein said multiplicity of banking lines each includes an endless track driven by said mode control means.

9. The banking and merging apparatus of claim 1, wherein neatening means is located along each of said banking lines, said neatening means being for contacting products while they move along said respective banking lines.

10. The banking and merging apparatus of claim 1, further including a tamping assembly located along each respective banking line, said tamping assembly including tamper plates that are generally perpendicular to said respective banking line, said tamping assembly including means for reciprocating said tamper plates in a direction generally toward and away from said respective banking line.

11. The banking and merging apparatus of claim 1, further including a vibrator assembly located along each respective banking line.

12. The banking and merging apparatus of claim 1, wherein said infeed flow means translates products having a generally horizontal orientation, said banking lines include moving upstanding members for supporting products thereon in a generally vertical orientation, and said merge means translates products having a generally horizontal orientation.

13. The banking and merging apparatus of claim 1, further including signal means for indicating the presence of products at certain locations along the apparatus and for transmitting signals to said mode control means.

14. The banking and merging apparatus of claim 1, wherein said infeed flow means includes generally perpendicular rotating side belt pairs, said side belt pairs operating at a speed that is substantially the same as that of said infeed flow means.

15. The banking and merging apparatus of claim 1, wherein said merge means includes a cam tracking assembly having a cam track and cam followers with respective pusher assemblies depending therefrom.

16. The banking and merging apparatus of claim 1, wherein said merge means includes pusher means having a movable rake member, said pusher means being for moving products generally toward the longitudinal center of the merge means while the products pass therethrough.

17. The banking and merging apparatus of claim 1, wherein said merge means includes a fixed set of elongated circular rods that support the products while they pass through said merge means.

18. The banking and merging apparatus of claim 1, wherein said merge means includes movable rake members and a fixed set of elongated circular rods, said rake members including indents that are generally complementary to said elongated rods.

19. The banking and merging apparatus of claim 1, wherein said merge means includes a cam trackway assembly having a movable transverse trackway and a plurality of pusher assemblies mounted therealong.

20. The banking and merging apparatus of claim 1, wherein said merge means includes a cam trackway assembly having a movable transverse trackway with a fence member depending therefrom.

21. The banking and merging apparatus of claim 1, wherein said merge means includes a cam trackway assembly having a movable transverse trackway with a fence member depending therefrom and a plurality of pusher assemblies mounted therealong, each said pusher assembly having a rake member mounted thereon, said rake member being generally perpendicular to said fence member.

22. The banking and merging apparatus of claim 1, wherein said merge means includes movable pusher means having rake pins mounted thereon, said movable pusher means moving products generally toward the longitudinal center of the merge means while products pass therethrough from any of said banking lines.

23. A method for banking and merging a continuous outflow of products from an infeed flow of products having intermittent gaps in the infeed flow, comprising:
infeeding a flow of a plurality of groupings of products, said infeeding step including providing said products in groupings having intermittent gaps therebetween;
diverting one grouping of said infeed flow of products and banking said one grouping of products on one of a multiplicity of generally parallel banking lines, said banking step including translating the one banked grouping of products at a fill mode speed along said one banking line;
diverting another grouping of said infeed flow of products and banking said another grouping of products on another of the multiplicity of generally parallel banking lines, this another banking step including translating the another banked grouping of products at a fill mode speed along said another banking line;
regulating said one banking line in order to translate same at a feed mode speed during said another banking step, said fill mode speed being greater than said feed mode speed;
regulating said another banking line in order to translate same at a feed mode speed during said one banking step, said fill mode speed being greater than said feed mode speed; and
merging said feed mode products from said banking lines into a single outfeed line of products.

24. The banking and merging method of claim 23, further including slicing foodstuff and stacking slices of foodstuff thus formed into said plurality of groupings of products.

25. The banking and merging method of claim 23, wherein said infeeding step is at a speed generally the same as said fill mode speed.

26. The banking and merging method of claim 23, wherein said merging step is at a speed generally on the order of said feed mode speed.

27. The banking and merging method of claim 23, wherein said regulating step includes having said banking line at said fill mode speed overtake said banking line at said feed mode speed.

28. The banking and merging method of claim 23, further including neatening products while they move along each said banking line.

29. The banking and merging method of claim 23, further including tamping products while they move along each said banking line.

30. The banking and merging method of claim 23, further including vibrating said products while they move along each said banking line.

31. The banking and merging method of claim 23, wherein said products are generally horizontal during said infeeding step, said products are generally vertical during said banking step, and said products are generally horizontal during said merging step.

32. The banking and merging method of claim 23, wherein said regulating steps include indicating the presence of products and controlling said banking steps in response thereto.

33. The banking and merging method of claim 23, wherein said merging step includes pushing said products in a generally horizontal direction toward the single outfeed line of products.

* * * * *